United States Patent
Kitamura

(10) Patent No.: US 10,691,105 B2
(45) Date of Patent: Jun. 23, 2020

(54) CONTROL PANEL HAVING NC FUNCTION FOR MACHINE TOOL

(71) Applicant: KITAMURA MACHINERY CO., LTD., Toyama (JP)

(72) Inventor: Akihiro Kitamura, Toyama (JP)

(73) Assignee: KITAMURA MACHINERY CO., LTD., Toyama (JP)

( * ) Notice: Subject to any disclaimer, the term of this patent is extended or adjusted under 35 U.S.C. 154(b) by 0 days.

(21) Appl. No.: 15/759,590

(22) PCT Filed: Jun. 16, 2017

(86) PCT No.: PCT/JP2017/022299
§ 371 (c)(1),
(2) Date: Mar. 13, 2018

(87) PCT Pub. No.: WO2017/221827
PCT Pub. Date: Dec. 28, 2017

(65) Prior Publication Data
US 2019/0163168 A1    May 30, 2019

(30) Foreign Application Priority Data

Jun. 20, 2016  (JP) .................................. 2016-121420

(51) Int. Cl.
G05B 19/414       (2006.01)
G05B 19/4155     (2006.01)
G05B 19/408       (2006.01)

(52) U.S. Cl.
CPC ....... *G05B 19/4147* (2013.01); *G05B 19/408* (2013.01); *G05B 19/414* (2013.01);
(Continued)

(58) Field of Classification Search
None
See application file for complete search history.

(56) References Cited

U.S. PATENT DOCUMENTS

| 5,408,076 A | 4/1995 | Griffanti |
| 7,353,995 B2 * | 4/2008 | Strickland ............ G05B 19/042 235/462.01 |

(Continued)

FOREIGN PATENT DOCUMENTS

| EP | 2849012 A1 | 3/2015 |
| JP | H01246042 A | 10/1989 |

(Continued)

OTHER PUBLICATIONS

Translation of ISR in Corresponding Application PCT/JP2017/022299 dated Sep. 5, 2017.
(Continued)

*Primary Examiner* — Kenneth M Lo
*Assistant Examiner* — Istiaque Ahmed
(74) *Attorney, Agent, or Firm* — Bacon & Thomas, PLLC

(57) ABSTRACT

To provide a control panel having NC function for machine tool, which is capable of using an information medium that is easily and securely manageable without requiring manual input of information to the control unit for simplifying the data reading system construction. The control panel having NC function for machine tool includes an image pickup device for reading a matrix-type two-dimensional code, which is installed on the front surface of the control panel, or on the on-hand manual pulse generator connected to the control panel. The control unit inside the control panel includes a reader which processes image data of the matrix type two-dimensional code captured by the image pickup device, and outputs the image data as read data, and start driving control to the machining section based on the work instruction information contained in the read data.

1 Claim, 2 Drawing Sheets

(52) U.S. Cl.
CPC ............... *G05B 19/4155* (2013.01); *G05B 2219/35481* (2013.01); *G05B 2219/36169* (2013.01); *G05B 2219/36371* (2013.01); *G05B 2219/36513* (2013.01)

(56) References Cited

U.S. PATENT DOCUMENTS

| | | | |
|---|---|---|---|
| 2007/0001012 A1* | 1/2007 | Kim | H05B 6/6441 235/462.13 |
| 2015/0134115 A1 | 5/2015 | Gong et al. | |
| 2017/0139397 A1* | 5/2017 | Kawai | G05B 19/409 |

FOREIGN PATENT DOCUMENTS

| | | |
|---|---|---|
| JP | H0273208 U | 6/1990 |
| JP | 2000_39908 A | 2/2000 |
| JP | 3187969 U | 12/2013 |
| TW | 486614 B | 5/2002 |
| WO | 6_168018 A | 6/1994 |
| WO | WO2014_057854 A1 | 4/2014 |
| WO | WO2015_190193 A1 | 4/2017 |

OTHER PUBLICATIONS

Extended European Search Report in corresponding Appln. PCT/JP2017/022299 dated Jul. 8, 2019.
Written Opinion of International Search Report (translation) in corresponding Appln. PCT/JP2017/022299 dated Sep. 20, 2018.

* cited by examiner

CONTROL PANEL HAVING NC FUNCTION FOR MACHINE TOOL

TECHNICAL FIELD

The present invention relates to an NC unit connected to a machine tool body for carrying out numerical control operations. More specifically, the present invention relates to the NC unit with a mechanism for reading matrix type two-dimensional codes.

BACKGROUND ART

The machining center generally employs the NC unit for numerically controlling the machine tool body. The NC unit is mostly configured to have a control panel having NC function disposed on a cover wall enclosing the machine tool body near the machining section.

As disclosed in Patent Literature 1, the above-described control panel having NC function includes a display screen at the upper region on the surface, and function keys, a CF card slot, a USB port, which are disposed around the screen. The control panel further includes a keyboard having a mouse pad and a mouse button, and various keys such as switches and dials in association with operations disposed at the lower region.

The NC program for carrying out various machining operations may be input to the storage unit of the built-in control unit via the control panel. The tool information in accordance with the program, that is, the name and number of the tool to be selected and switched in the respective machining stages, the corresponding magazine storage address, the numerical value corresponding to the tool radius to be corrected on coordinates, that is, offset data are input through key operations performed by the operator.

Upon automatic machining operation in accordance with the NC program, the operator calls the corresponding NC program from the storage unit while observing the screen display on the control panel referring to the work instruction sheet. In some cases, the operator makes necessary setting, for example, by carrying out additional input, modification, adjustment, or input of the tool information. After completion of setting, the operator commands the control unit via the operation switch to allow the machine tool body to start driving in accordance with the selected program so that the programmed operation is executed.

As described above, most part of the setting required for the automatic operation may be carried out through the control panel having NC function near the machining section of the machine tool body.

CITATION LIST

Patent Literature

Patent Literature 1: Japanese Utility Model Registration Publication No. 3187969
Patent Literature 2: Japanese Patent Application Laid-Open No. 2006-39903

SUMMARY OF INVENTION

Technical Problem

The generally employed control panel as described above requires manual operations performed by the operator for carrying out major part of the operation, leading to compli- cated input operations. Such operation may be a burden on the operator, resulting in the risk of errors.

The solution has been proposed that the IC tag in which the work instruction information is recorded is attached to the work instruction sheet (see Patent Literature 2). The IC tag is configured by connecting an antenna to the IC chip installed with the CPU, memory, transceiver circuit, and power supply circuit. The power supply circuit is powered through the antenna. Direct input of the information on the work instruction recorded in the IC tag may release the operator from the complicated operation and input errors.

The IC tag attached to the sheet is likely to be broken by the physical external force. Furthermore, the electromotive force cannot be obtained upon failure of the antenna, thus failing to read the information. As the exclusive reader has to be installed in the NC unit, construction of the system may be complicated.

It is an object of the present invention to provide the control panel having NC function for machine tool, which allows use of the information medium that can be easily and securely managed, and simple construction of the system for reading the information without requiring manual input of the information to the control unit.

Solution to Problem

According to the present invention, a control panel having NC function is connected to a machine tool body for executing a numerical control operation. The control panel has a front surface on which a display screen and an input section having a large number of keys are arranged. The control panel includes a control unit and a storage unit installed inside. The control unit is configured to drive a machining section of the machine tool body in accordance with a predetermined program, and the storage unit is configured to store various programs and tool information. The control panel further includes an image pickup device for reading a matrix type two-dimensional code. The image pickup device is installed on the front surface of the control panel, or on an on-hand manual pulse generator which is connected to the control panel. The control unit includes a reader configured to process image data of the matrix type two-dimensional code captured by the image pickup device, and to output the processed image data as read data. Based on work instruction information contained in the read data from the reader, a drive control to the machining section is started.

In the control panel having NC function for machine tool according to the present invention, the control unit is configured to switch an operation mode between a first mode and a second mode. The first mode is selected when the read data include only a program number corresponding to the program preliminarily stored in the storage unit so that the program corresponding to the program number is called to command the machining section to execute a driving operation in accordance with the called program. The second mode is selected when the read data include the program so as to command the machining section to execute the driving operation in accordance with the program.

Advantageous Effects of Invention

In the control panel having NC function for machine tool according to the present invention, the front surface of the control panel or an on-hand manual pulse generator connected to the control panel has an image pickup device installed for reading the matrix type two-dimensional codes.

The control panel has a reader installed therein for processing image data of the matrix type two-dimensional codes captured by the image pickup device, and outputs read data. The control panel according to the present invention makes it possible to readily input the work instruction information for NC program operation in the form of the matrix type two-dimensional codes which can be managed more stably and more easily than the generally employed IC tag and the like without requiring manual operations. This makes it possible to allow more efficient machining operations.

DESCRIPTION OF EMBODIMENTS

Figure 1:
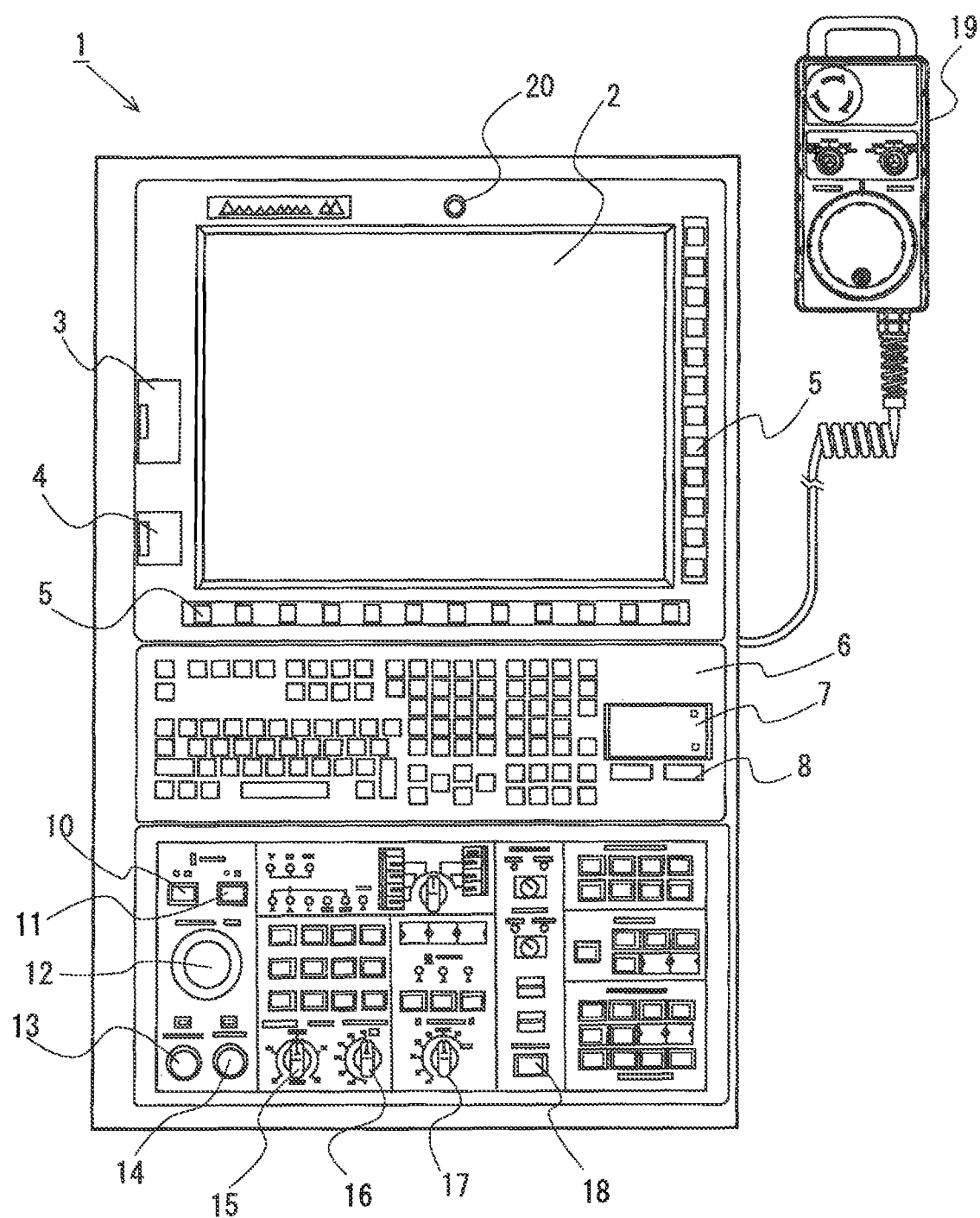
FIG. 1 is a schematic front view of the control panel having NC function for machine tool according to an example of the present invention.

The control panel having NC function according to the present invention is connected to the machine tool body for executing the numerical control. An image pickup device for reading the matrix type two-dimensional codes is installed on the front surface of the control panel, or on the manual pulse generator for operation connected to the control panel. The control unit includes the reader configured to process image data of the matrix type two-dimensional codes captured by the image pickup device and to output the processed data as read data. Based on the work instruction information contained in the read data from the reader, the drive control to the machining section is started.

The above-described structure according to the present invention is capable of taking the work instruction information that has been input upon start of the NC program operation for machining into the control unit momentarily from the image pickup device in the form of the matrix type two-dimensional codes, and reading such information as the read data. This makes it possible to eliminate the manual input operation which has been generally performed by the operator.

The matrix type two-dimensional code itself is formed of a pattern including white square cells and black square cells in a matrix displayed into a longitudinal and transverse mosaic arrangement. The necessary information is preliminarily encoded so as to be directly printed on the work instruction sheet, or printed on another sheet to be attached to the work instruction sheet. Therefore, compared with the use of the generally employed medium such as the IC tag, the code may be generated more easily, and hardly cause the risk of data corruptive owing to circuit breakage. They can be managed more easily and more securely than the IC tag management.

There are various kinds of matrix type two-dimensional codes, for example, OR code (registered trademark), DataMatrix (registered trademark), MaxiCode, AztecCode, VeriCode, and the like. The encoding-decoding software for those codes are readily available. It is possible to select the code in accordance with the required capacity. In the case of encoding the relatively large-sized information, it is preferable to use the code with large capacity, which can be read faster. The use of the code capable of restoring information against partial fouling of the code itself upon reading is more preferable. The use of the matrix type two-dimensional code with capacity above a certain level allows encoding of not only the program number but also the NC program itself and the tool information including offset data into the simple code.

For example, the QR code (registered trademark) currently ha the maximum capacity (version 40) of 7089 numerals, 4296 alphanumeric characters, 2953 bytes of binary data (8-bit), or 1817 Chinese/Kana characters. The code with the above-described capacity has the function of repairing smudges or missing parts so as to restore the data readable even if 10% to 30% of the code itself is missing. This makes it possible to manage the work instruction information and the tool information more easily and more stably.

Upon reading of the matrix type two-dimensional code, the gray (white and black) image picked up by the image pickup device is converted into the binarized image. The converted image is then decoded. The image pickup device for reading the matrix type two-dimensional code may be configured by means of a mechanism to be able to transmit the picked up image to the reader of the control unit as the binarizable gray image data. That is, the image pickup device may be the camera equipped with the solid-state image pickup element, for example, CDD and CMOS. Installation of the above-described camera in the control panel having its lens exposed to the front surface allows pickup of an image of the two-dimensional code only by facing the two-dimensional code printed on the work instruction sheet or the like to the front of the lens. The image data transmitted to the control unit are immediately decoded by the reader. Finally, the encoded information can be obtained as the read data.

There may be the case that the control panel having NC function for machine tool is provided with the manual pulse generator which allows on-hand operation. In such a case, the manual pulse generator can be freely moved apart from the control panel by the distance corresponding to a connection cord. Installation of the camera as the image pickup device for reading the matrix type two-dimensional code in the manual pulse generator allows image pickup operation by facing the camera to the work instruction sheet on which the two-dimensional code is printed. The control unit inside the control panel allows the machining section of the machine tool body to execute machining operation as instructed in accordance with the read data information obtained by processing the image pickup data of the two-dimensional code.

Mainly, the information necessary for the machining section of the machine tool body to carry out the NC program operation includes the program itself and the tool information containing the tool offset data. There may be two modes for inputting the work instruction information. In one mode that the program and tool information have been already stored in the storage unit, only the instruction information for calling the required program and the required tool information (for example, the corresponding program number only) may be input. In the other mode, the program and the tool information have to be input as the work instruction information.

Preferably, the control unit is configured to execute the NC program operation coping with at least the above-described two modes for inputting the matrix type two-dimensional code. Specifically, the control unit is configured to switch the mode between the first mode in which the read data include only the program numbers each corresponding to the program preliminarily stored in the storage unit of the control unit, and the second mode in which the read data include the program itself and the tool information.

In the case that the read data include only the program numbers, the control unit selects and switches the first mode for calling the program corresponding to the program number from the storage unit so that the command is transmitted for driving operations to the machining section in accordance with the called program.

In the case that the read data include the program itself and the tool information, the control unit selects and switches the second mode for transmitting the command for driving operations to the machining section in accordance with the program as the read data. At this time, if necessary, the tool offset data contained in the tool information may be used in accordance with the program.

The control unit may be configured to select another mode besides those as described above. For example, the third mode may be set for coping with the case where the read data only include the program number and the tool information, and the program itself is stored in the storage unit. If the read data include the program number and the tool information only, the control unit selects and switches the third mode so that the program corresponding to the program number is read from the storage unit. Then the command for driving operations is transmitted to the machining section in accordance with the program. If necessary, the offset data of the tool information contained in the read data may be used in accordance with the program.

Example

Figure 2:
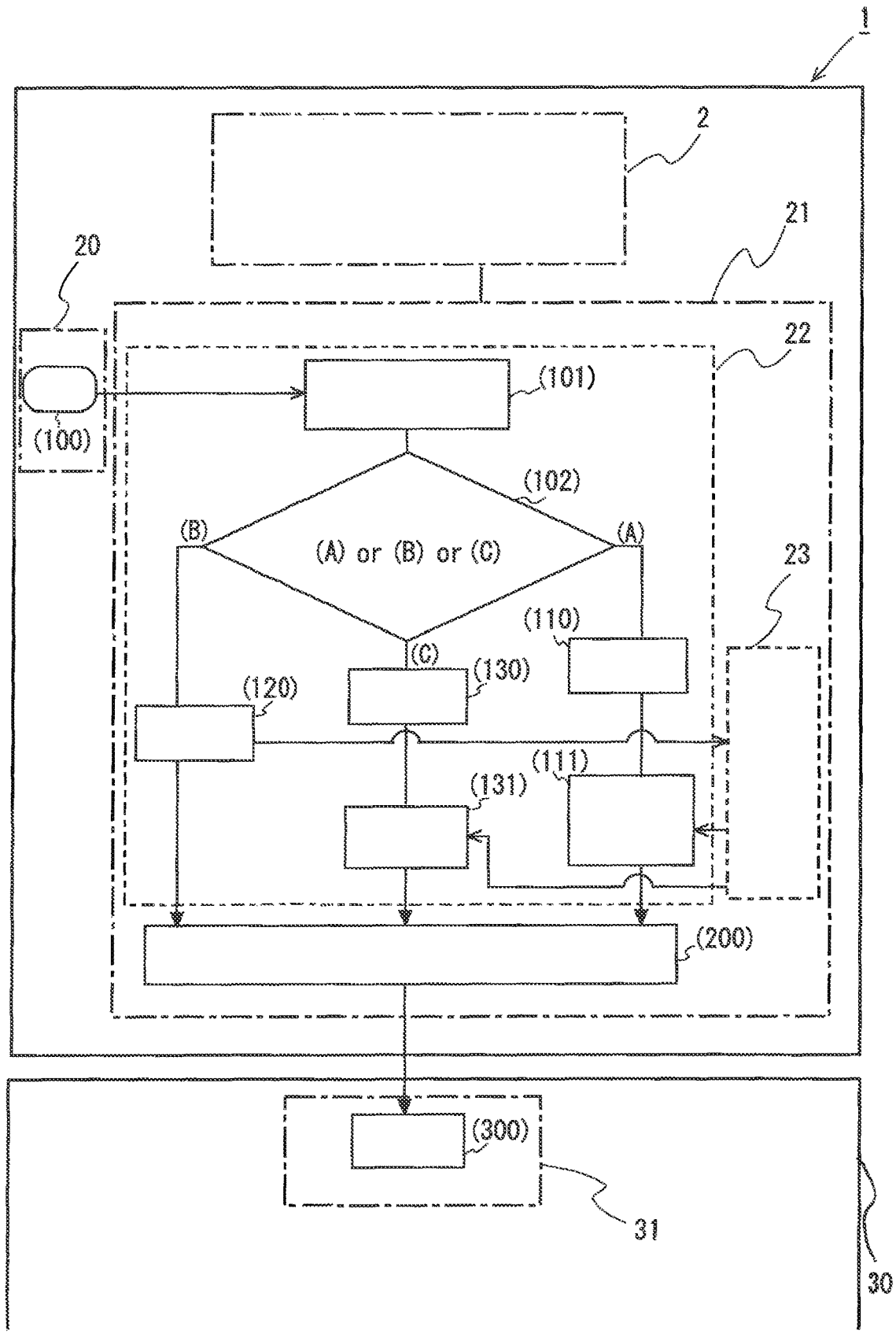
FIG. 2 is an inner conceptual view including flowchart for explaining operations of the control panel as shown in FIG. 1.

The control panel having NC function for machine tool according to an example of the present invention will be described referring to FIGS. 1 and 2. FIG. 1 is a schematic front view of an control panel 1. FIG. 2 is an inner conceptual view including flowchart for explaining operations of the control panel 1.

The control panel 1 with NC function according to the example is connected to a machine tool body 30, and allows a machining section 31 to execute NC program operations under the numerical control. The control panel 1 is disposed adjacent to the machine tool body 30, for example, disposed close to an operation window on the exterior cover that encloses the machining section 31. At this time, the control panel 1 may be structured rotatable with respect to the support shaft as the rotation center along one of vertical sides of the control panel 1.

The basic structure of the control panel 1 is similar to that of the generally employed control panel having NC function for machine tool. That is, a display section 2 as a liquid crystal display is disposed on the front surface of the control panel 1 at the upper region. Function keys 5 are arranged longitudinally and horizontally around the screen along its sides for switching the screen as well as selecting and switching the soft-key menu. A CF card slot 3 and an USB port 4 are also disposed so as to allow input/output of various data. A keyboard 6 including a mouse pad 7 and a mouse button 8 is disposed below the display section 2.

Arranged below the keyboard 6 are various buttons and switches for driving operation including, for example, an operation preparation switch 10, an operation end switch 11, an emergency stop switch 12, an automatic operation startup switch 13, and a feed hold switch 14. Furthermore, a manual feed speed setting switch 15, a fast forward overriding switch 16, a spindle rotation speed overriding switch 11, an operation door interlock release button 18 and the like are also disposed in the lower region.

In the example, a CCD camera 20 as the image pickup device for reading the matrix type two-dimensional code is installed above the display section 2 at the center on the front surface of the control panel 1. The camera 20 picks up an image of the two-dimensional code such as QR code (registered trademark) so that the picked up image data are output to the control unit 21 installed in the control panel 1.

The control unit 21 drives the machining section of the machine tool body in accordance with the predetermined program so as to execute the NC program operation. The control unit 21 includes a storage unit 23 for storing various programs and tool information, and a reader 22 for processing the image data of the matrix type two-dimensional code captured by the camera 20 as described above and outputting the processed image data as the read data.

In the example, upon setting before starting the machining operation, the matrix type two-dimensional code is input, and in the control unit 21, the read data containing the work instruction information which was read from the input data are output. The control unit 21 is configured to execute the control in three modes switchable in accordance with the work instruction information. Those modes include the first mode for the case where the read data include the program number only, the second mode for the case where the read data include the program and the tool information containing the tool offset data, and the third mode for the case where the read data only include the program number and the tool information.

Meanwhile, the operator preliminarily generates the matrix type two-dimensional code which contains the work instruction information upon start of the operation in accordance with the NC program operation for the actual machining.

For example, if the program for the intended NC program operation and the tool information have been already stored in the storage unit 23, the matrix type two-dimensional code is generated as the work instruction information containing only the program number for the first mode so as to be printed on the work instruction sheet.

If the program for the intended NC program operation and the tool information are not stored in the storage unit 23, requiring additional input of such data, the matrix type two-dimensional code is generated as the work instruction information containing the program itself and the tool information for the second mode. The thus generated code is printed on the work instruction sheet.

If the program for the intended NC program operation has been already stored in the storage unit 23, but the corresponding tool information has not been stored, the matrix type two-dimensional code is generated as the work instruction information containing the corresponding program number and the tool information for the third mode. The thus generated code is printed on the work instruction sheet.

As described above, in the control panel 1 according to the example, upon startup of the specific NC program operation, only by facing the work instruction sheet to the CCD camera 20, the camera 20 can pick up the image of the matrix type two-dimensional code printed on the work instruction sheet, so that the intended NC program operation is executed. The operation performed by the control unit 21 will be described below.

An image of the matrix type two-dimensional code such as QR code (registered trademark) is picked up by the CCD camera 20 (100). The picked up image data are decoded through processing executed by the reader 22 to obtain the read data (101). Then the control mode is selected and switched in accordance with the obtained read data (102). If the read data contain only the program number (case (A)), the first mode is selected and switched (110). In the first mode, based on the read data of the program number as the work instruction information, the program and the tool information corresponding to the program number are called from the storage unit 23 (111). In accordance with the called program, the NC program operation is executed (200) while using the tool information so that the machining section 31 is allowed to execute the machining operation (300).

If the read data contain the program and the tool information (case (B)), the second mode is selected and switched (120). In the second mode, the NC program operation is executed (200) in accordance with the obtained read data of the program as the work instruction information while using the obtained tool information. Then the machining operation is executed (300). The second mode may be set so that the obtained program and the tool information are stored in the storage unit 23.

If the read data contain the program number and the tool information (case (C)), the third mode is selected and switched (130). In the third mode, based on the read data of the program number and the tool information as the work instruction information, the corresponding program is called from the storage unit 23 (131). The NC program operation is executed (200) in accordance with the called program while using the obtained tool information so that the machining operation is executed (300).

As described above, the control panel 1 according to the example is configured to allow the intended NC program operation by reading the matrix type two-dimensional code as the work instruction information easily and quickly without requiring the manual input.

In the example, the CCD camera 20 as the image pickup device for reading the matrix type two-dimensional code is installed on the control panel 1. However, the present invention is not limited to the above-described structure. In the case that an on-hand manual pulse generator 19 is connected to the control panel 1, the image pickup device may be installed on the manual pulse generator 19. In this case, the image pickup device is moved together with the manual pulse generator 19. Therefore, the image pickup device can be brought close to the two-dimensional code so as to be captured.

REFERENCE SIGNS LIST

1: control panel having NC function,
2: display section,
3: CF card slot,
4: USB port,
5: function key,
6: keyboard,
7: mouse pad,
8: mouse button,
10: operation preparation switch,
11: operation end switch,
12: emergency stop switch,
13: automatic operation startup switch,
14: feed hold switch,
15: manual feed speed setting switch,
16: fast forward overriding switch,
17: spindle rotation speed overriding switch,
18: operation door interlock release button,
19: manual pulse generator,
20: CCD camera (image pickup device for reading matrix type two-dimensional code),
21: control unit,
22: reader,
23: storage unit,
30: machine tool body,
31: machining section

The invention claimed is:

1. A control panel having NC function, connected to a machine tool body for executing a numerical control operation, the control panel having a front surface on which a display screen and an input section having a large number of keys are arranged, and including a control unit and a storage unit installed inside, the control unit being configured to drive a machining section of the machine tool body in accordance with a predetermined program, and the storage unit being configured to store various programs and tool information, wherein:

the control panel further including an image pickup device for reading a matrix type two-dimensional code, the image pickup device being installed on the front surface of the control panel, the control unit includes a reader configured to process image data of the matrix type two-dimensional code captured by the image pickup device, and to output the processed image data as read data; and based on work instruction information contained in the read data from the reader, a drive control to the machining section is started, and the control unit is configured to switch an operation mode between a first mode and a second mode, the first mode being selected when the read data includes only a program number corresponding to the program preliminarily stored in the storage unit so that the program corresponding to the program number is called to command the machining section for a driving operation in accordance with the called program, and the second mode being selected when the read data includes the program so as to command the machining section for the driving operation in accordance with the program and stores the program in the storage unit.

* * * * *